(12) United States Patent
Huang

(10) Patent No.: US 12,160,679 B2
(45) Date of Patent: Dec. 3, 2024

(54) FOLDABLE TELEPROMPTER

(71) Applicant: Xita Huang, Shenzhen (CN)

(72) Inventor: Xita Huang, Shenzhen (CN)

(*) Notice: Subject to any disclaimer, the term of this patent is extended or adjusted under 35 U.S.C. 154(b) by 471 days.

(21) Appl. No.: 17/457,670

(22) Filed: Dec. 6, 2021

(65) Prior Publication Data
US 2022/0094820 A1 Mar. 24, 2022

(30) Foreign Application Priority Data
Jan. 8, 2021 (CN) .......................... 202120052146.6

(51) Int. Cl.
*H04N 5/222* (2006.01)
*G02B 27/10* (2006.01)

(52) U.S. Cl.
CPC ........... *H04N 5/2222* (2013.01); *G02B 27/10* (2013.01)

(58) Field of Classification Search
CPC .......... H04N 5/2222; G02B 27/00–648; G02B 2027/0105–0198
See application file for complete search history.

(56) References Cited

U.S. PATENT DOCUMENTS

| 9,030,603 B1* | 5/2015 | Vito ..................... H04N 5/2222 348/375 |
| 2009/0256970 A1 | 10/2009 | Bilbrey et al. |
| 2015/0009402 A1* | 1/2015 | Vito ..................... H04N 23/51 348/375 |
| 2017/0034404 A1 | 2/2017 | Arroyo Martinez |
| 2017/0064158 A1 | 3/2017 | Arce |

* cited by examiner

*Primary Examiner* — Bao-Luan Q Le
*Assistant Examiner* — Christopher A Lamb, II
(74) *Attorney, Agent, or Firm* — Hemisphere Law, PLLC; Zhigang Ma

(57) ABSTRACT

The present disclosure provides a foldable teleprompter, including a main shell used to be abutted with a lens, and a supporting plate and a beam splitter which are rotatably mounted on the main shell; the main shell is encircled into a box body structure with an opening in one side; the beam splitter can be accommodated in an accommodating space of the main shell after being flipped; after being flipped, the supporting plate can cover the opening side of the main shell to form a cover plate, so as to seal the beam splitter in the main shell.

5 Claims, 7 Drawing Sheets

FOLDABLE TELEPROMPTER

TECHNICAL FIELD

The present disclosure belongs to the technical field of teleprompters, in particular to a foldable teleprompter.

BACKGROUND ART

The teleprompter displays the content of a manuscript through a high-brightness display, and reflects the displayed content of the display on special coated glass at an angle of 45 degrees in front of a lens of a camera to reflect lines so that a speaker can face the camera while reading the lines. The speaker, the teleprompter, the camera, and a tripod are supported on the same axis, which creates the intimacy that the speaker always faces the audiences and improves the quality of the speech.

However, A light shield part of the traditional teleprompter occupies a large space, and the light shield part is not foldable during transportation and non-use. Therefore, it occupies a large space during transportation and storage, which is not conducive to transportation and storage.

SUMMARY

The present disclosure mainly aims to provide a foldable teleprompter and a track lamp, and aims to solve the technical problem that the existing teleprompter occupies a large space in transportation, storage, and other non-use states.

In order to achieve the above objective, the present disclosure uses the following technical solution:

a foldable teleprompter, including a main shell used to be abutted with a lens, and a supporting plate and a beam splitter which are rotatably mounted on the main shell; the main shell is encircled into a box body structure with an opening in one side; the beam splitter can be accommodated in an accommodating space of the main shell after being flipped; after being flipped, the supporting plate can cover the opening side of the main shell to form a cover plate, so as to seal the beam splitter in the main shell.

Further, a foldable light shield is further arranged between the beam splitter and the main shell; and the foldable light shield is connected with the beam splitter and the main shell.

Further, the foldable light shield is a flexible light shield.

Further, a limiting structure is arranged at a joint of the supporting plate and the main shell, and the limiting structure enables the supporting plate to be stably perpendicular to the main shell after the supporting plate is flipped.

Further, a side of the supporting plate facing the main shell is provided with a pivot lug, and a position of the main shell corresponding to the pivot lug is provided with a pivot slot; the pivot lug extends into the pivot slot and forms pivot connection through a pivot shaft; after the pivot lug rotates to a position perpendicular to the main shell, an inner wall of the pivot slot resists against and supports the pivot lug.

Further, a bottom plate of the main shell is provided with an abutment hole used to be abutted with the lens.

Further, the main shell is provided with a locking slot used to lock the supporting plate; a position of the supporting plate corresponding to the locking slot is provided with a locking bulge; after the supporting plate covers the main shell, the locking bulge extends into the locking slot, so as to lock the supporting plate to the main shell.

Further, the main shell is provided with an avoiding gap used to facilitate pushing up the beam splitter; a position of the beam splitter corresponding to the avoiding gap is provided with an extending bulge; after the beam splitter is accommodated in the main shell, the extending bulge is embedded in the avoiding gap, so as to push up the beam splitter from the main shell.

The present disclosure has the beneficial effects.

1. The traditional light shield is designed to be a flexible foldable material, and the main shell is designed to be a box body shape with the opening in one side, so that the beam splitter connected to the light shield can be flipped to enable the light shield to be accommodated in the accommodating space of the main shell, and the accommodating space is sealed through the supporting plate; therefore, a small space is occupied during transportation, storage, and the like, which is conductive to transportation and storage.

2. The supporting plate and the main shell are connected through a pivot structure; the limiting structure is arranged at the joint of the supporting plate and the main shell; when the supporting plate is spread to a working state, the supporting plate can resist against the limiting structure, so as to be stably perpendicular to the main shell, so that the supporting plate connection structure is designed flexibly and simply, which is convenient for closure of the supporting plate.

BRIEF DESCRIPTION OF THE DRAWINGS

In order to describe the technical solutions in the embodiments of the present disclosure more clearly, accompanying drawings required to be used in the descriptions of the embodiments will be briefly introduced below. Obviously, the drawings in the illustration below are merely some embodiments of the present disclosure. Those ordinarily skilled in the art also can acquire other drawings according to the provided drawings without doing creative work.

DETAILED DESCRIPTION OF THE EMBODIMENTS

The technical solutions in the embodiments of the present disclosure will be described clearly and completely below. Obviously, the embodiments described herein are only part of the embodiments of the present disclosure, not all the embodiments. Based on the embodiments in the present disclosure, all other embodiments obtained by those of ordinary skill in the art without creative work shall fall within the protection scope of the present disclosure.

Figure 1:
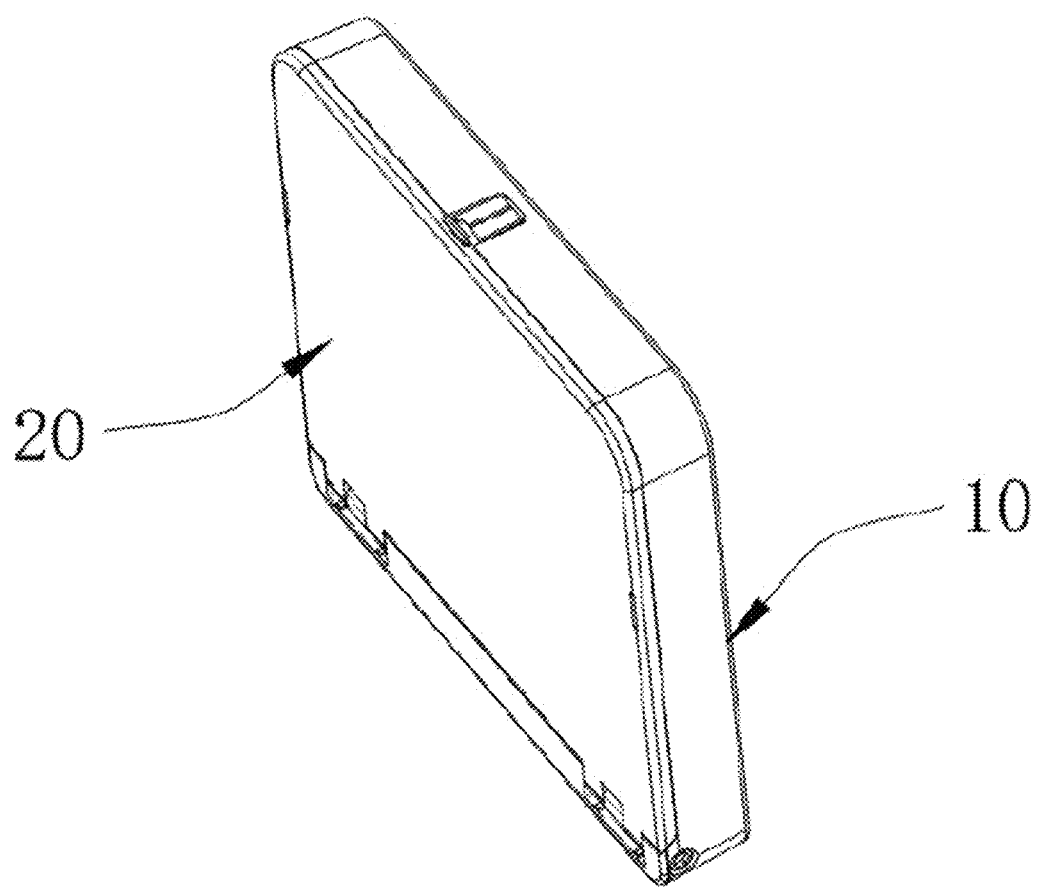
FIG. 1 is a schematic structural diagram of a closed state of a foldable teleprompter provided in an embodiment of the present disclosure.
Figure 2:
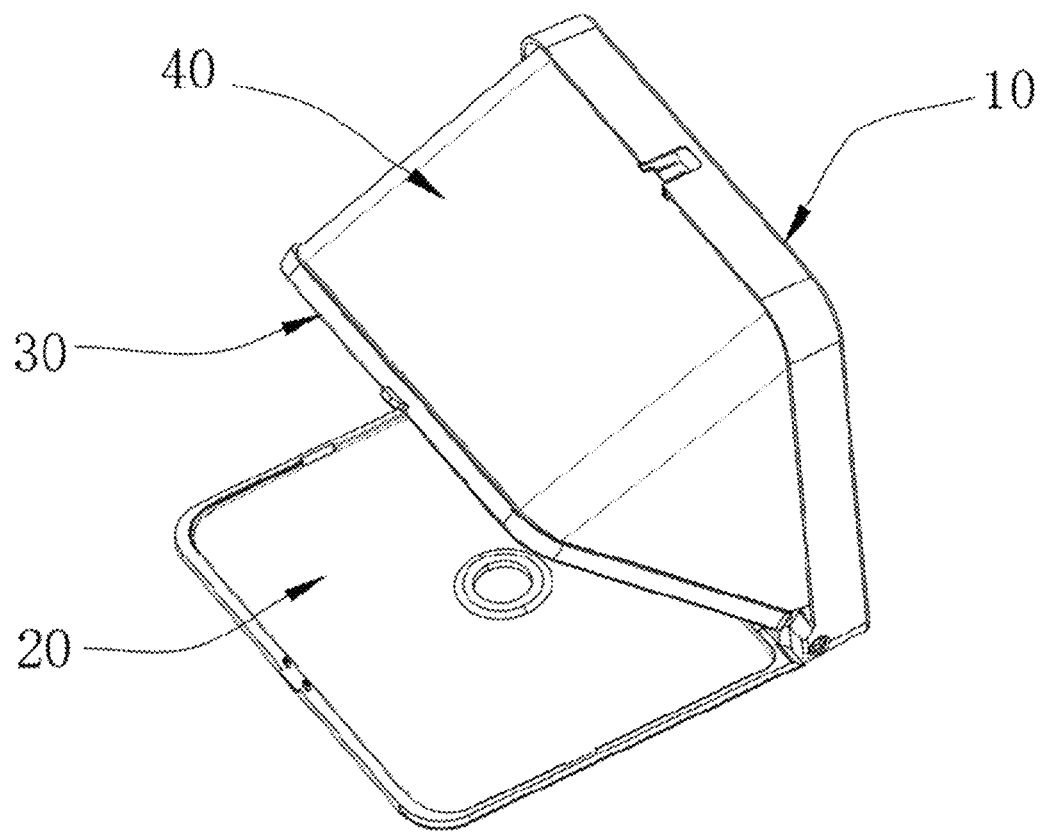
FIG. 2 is a schematic structural diagram of a spread state of the foldable teleprompter of FIG. 1.
Figure 3:
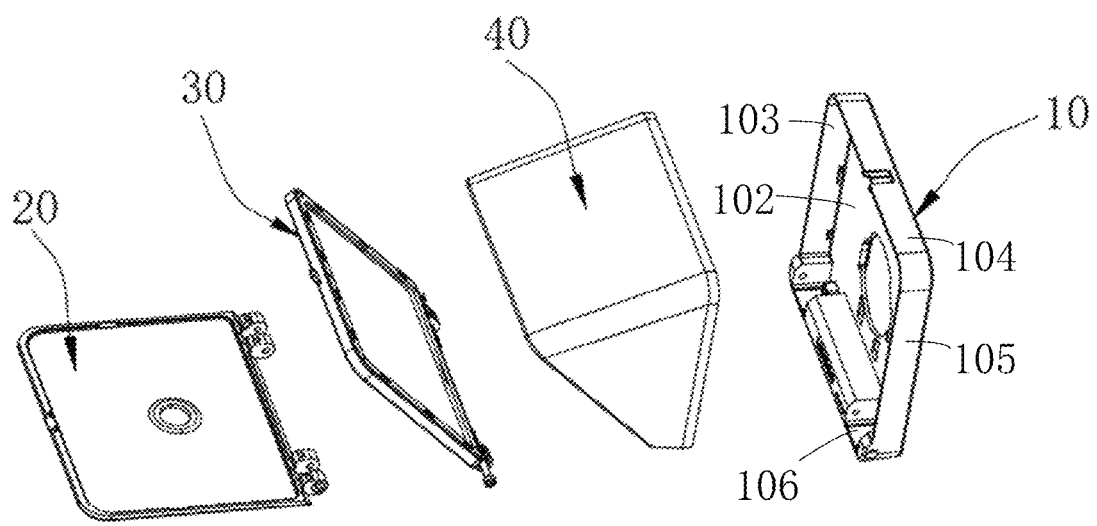
FIG. 3 is an exploded diagram of a spread state of the foldable teleprompter of FIG. 2.
Figure 4:
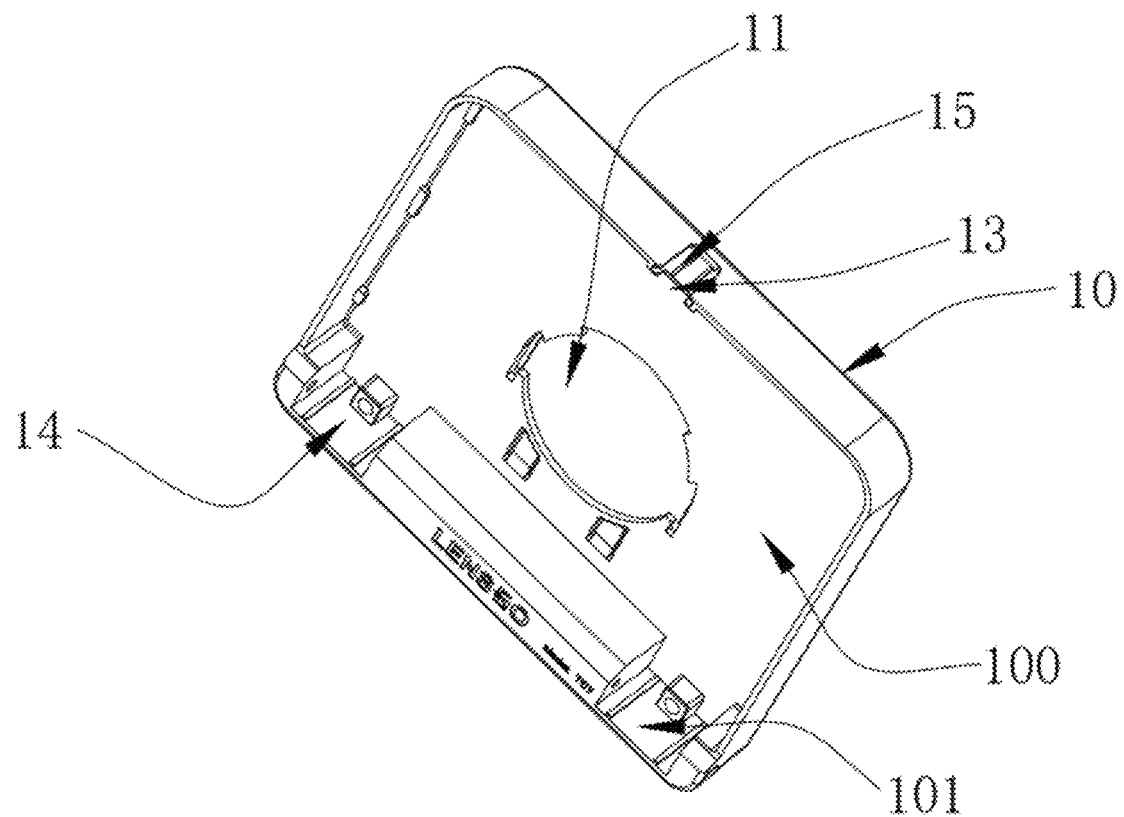
FIG. 4 is a schematic structural diagram of a main shell of the foldable teleprompter of FIG. 3.
Figure 5:
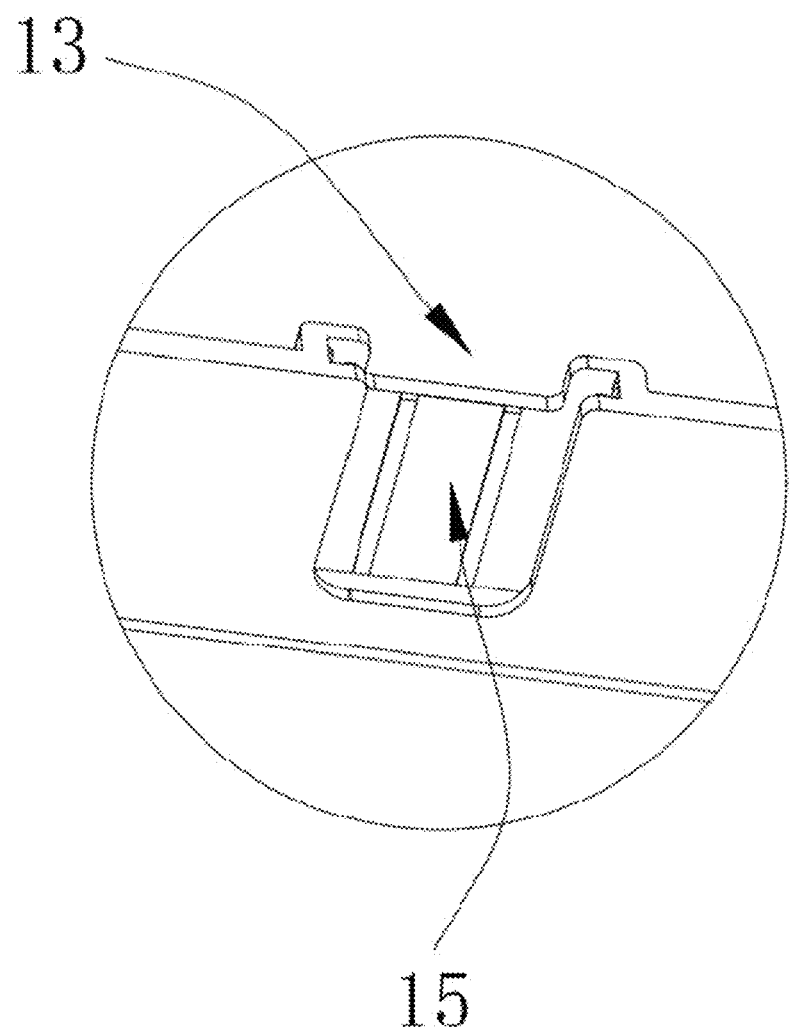
FIG. 5 is a partially enlarged diagram of the main shell of the foldable teleprompter of FIG. 4.
Figure 6:
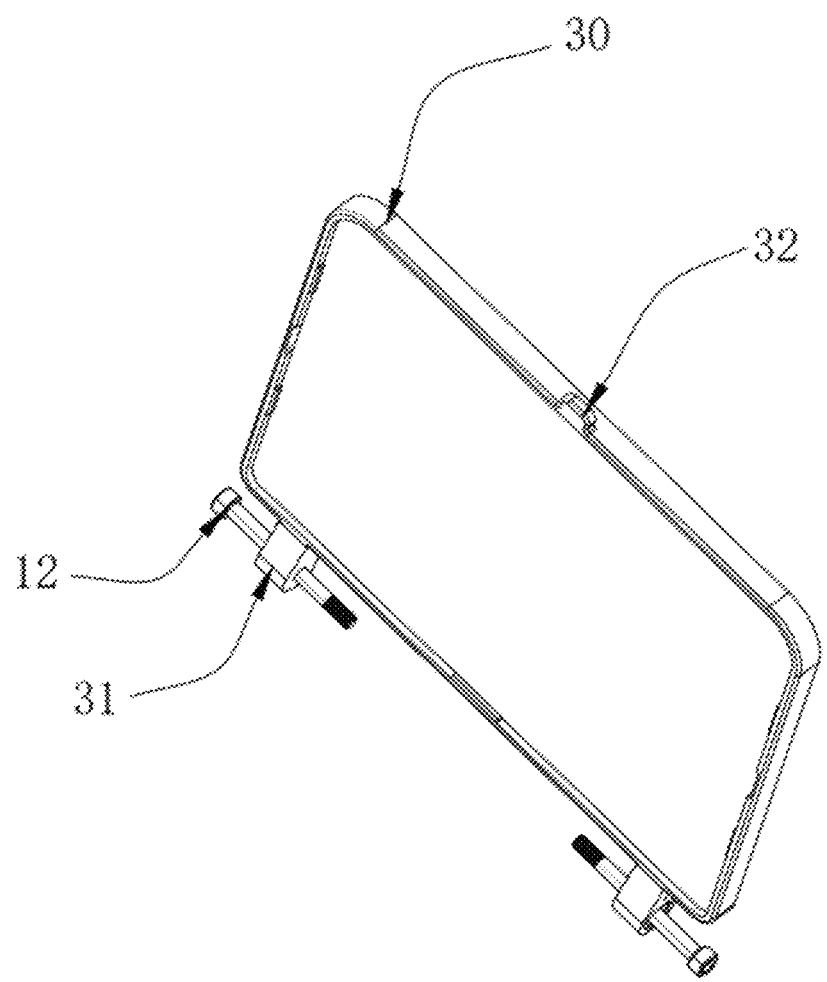
FIG. 6 is a schematic structural diagram of a beam splitter of the foldable teleprompter of FIG. 3.
Figure 7:
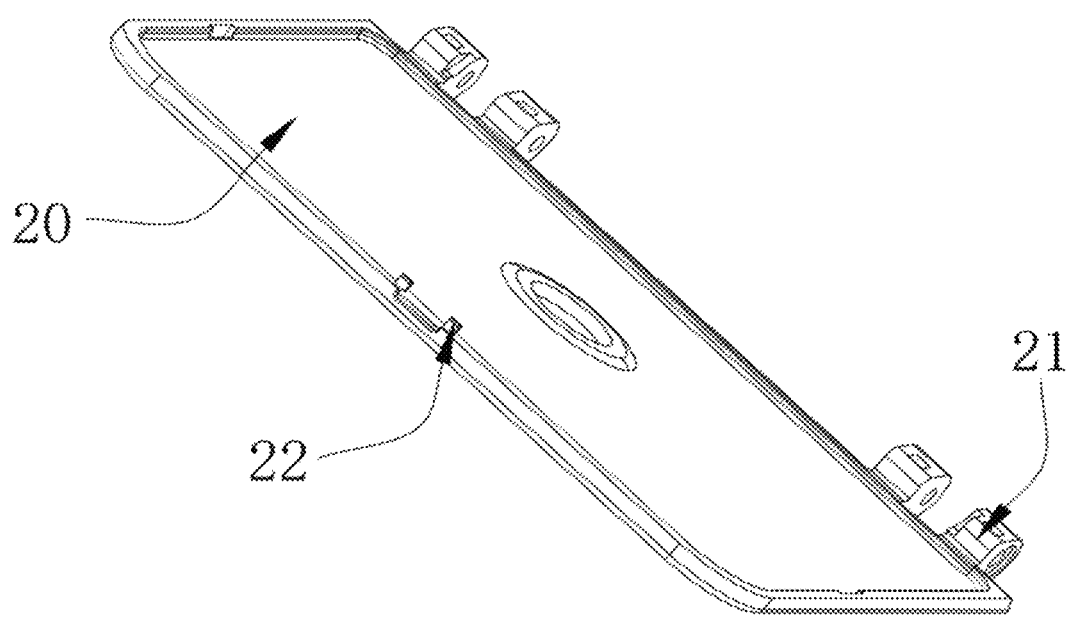
FIG. 7 is a schematic structural diagram of a supporting plate of the foldable teleprompter of FIG. 3.

As shown in FIG. 1, FIG. 2, and FIG. 3, an embodiment of the present disclosure provides a foldable teleprompter, including:

a main shell 10 used to be abutted with a lens, and a supporting plate 20 and a beam splitter 30 which are rotatably mounted on the main shell 10;

the main shell 10 includes a rear plate 102 and a first sidewall 103, a second sidewall 104, a third sidewall 105 opposite to the first sidewall 103, and a fourth sidewall 106, the first sidewall 103, the second sidewall 104 opposite to the second sidewall 104, the third sidewall 105, and the fourth sidewall 106 are connected in sequence and all extend from the rear plate 102 in a direction away from the rear plate 102, so that the rear plate 102 together with the first sidewall 103, the second sidewall 104, the third sidewall 105, and the fourth sidewall 106 forms a box body structure with an opening in one side, and the beam splitter 30 can be accommodated in an accommodating space 100 of the box body structure after being flipped;

one end of the supporting plate is rotatably connected to the first sidewall 103 and the third sidewall 105, after being flipped, the supporting plate 20 can cover the opening side of the main shell 10 to form a cover plate and another end of the supporting plate is connected with the second sidewall 104 at a side of the second sidewall 104 away from the rear plate 102, so as to seal the beam splitter 30 in the main shell 10.

Specifically, as shown in FIG. 4, FIG. 5, FIG. 6, and FIG. 7, a bottom plate of the main shell 10 is provided with an abutment hole 11 used to be abutted with a lens. In a working process, the lens of a camera can photograph a speaker after being aligned with the abutment hole 11.

One side of the beam splitter 30 is provided with a hinge arm 31, and a position of the main shell 10 corresponding to the hinge arm 31 is provided with a hinge shaft 12; and the hinge arm 31 is hinged to the hinge shaft 12, so as to mount the beam splitter 30 in the main shell 10 in a hinged manner.

The main shell 10 is provided with an avoiding gap 13 used to facilitate pushing up the beam splitter 30, and a position of the beam splitter 30 corresponding to the avoiding gap 13 is provided with an extending bulge 32;

after the beam splitter 30 is accommodated in the main shell 10, the extending bulge 32 is embedded into the avoiding gap 13, so as to push up the beam splitter 30 from the main shell 10.

A foldable light shield 40 is arranged between the beam splitter 30 and the main shell 10; the foldable light shield 40 is connected to the beam splitter 30 and the main shell 10; after the flipped beam splitter 30 is accommodated in the accommodating space 100 of the main shell 10, the light shield 40 is also simultaneously accommodated in the accommodating space 100.

In the embodiments of the present disclosure, the foldable light shield 40 is a flexible light shield, so that it is convenient for the light shield 40 to be accommodated in the accommodating space 100 of the main shell 10.

A limiting structure 101 is arranged at a joint of the supporting plate 20 and the main shell 10, and the limiting structure 101 enables the supporting plate 20 to be stably perpendicular to the main shell 10 after the supporting plate is flipped.

Specifically, a side of the supporting plate 20 facing the main shell 10 is provided with a pivot lug 21, and a position of the main shell 10 corresponding to the pivot lug 21 is provided with a pivot slot 14; the pivot lug 21 extends into the pivot slot 14 and forms pivot connection through a pivot shaft.

In the present disclosure, the limiting structure 101 is an inner wall of the pivot slot 14; after the pivot lug 21 rotates to a position perpendicular to the main shell 10, the inner wall 101 of the pivot slot 14 resists against and supports the pivot lug 21, so that it can be realized that the supporting plate 20 can be stably perpendicular to the main shell 10 after being flipped.

The main shell 10 is provided with a locking slot 15 used to lock the supporting plate 20, and a position of the supporting plate 20 corresponding to the locking slot 15 is provided with a locking bulge 22;

after the supporting plate 20 covers the main shell 10, the locking bulge 22 extends into the locking slot 15, so as to lock the supporting plate 20 to the main shell 10.

In actual use, the supporting plate 20 is flipped to be stably perpendicular to the main shell 10, and the beam splitter 30 rotates to a proper position; a speaker's mobile phone or iPad for playing the lines is placed on the supporting plate 20; and the lines are mapped to the beam splitter 30 through reflection of light;

then, the camera is aligned with the abutment hole 11 of the main shell, so that the speaker can face the camera while reading the lines. The speaker, the teleprompter, the camera, and a tripod are supported on the same axis, which creates the intimacy that the speaker always faces the audiences and improves the quality of the speech.

The implementation modes of the present disclosure are described in detail above in conjunction with the accompanying drawings, but the present disclosure is not limited to the described implementation modes. For those skilled in the art, various changes, modifications, alterations, and transformations are made to these implementation modes without departing from the principle and spirit of the present disclosure, and shall still fall within the protection scope of the present disclosure.

What is claimed is:

1. A foldable teleprompter, comprising: a main shell used to be abutted with a lens, and a supporting plate and a beam splitter which are rotatably mounted on the main shell, wherein the main shell comprises a rear plate and a first sidewall, a second sidewall, a third sidewall opposite to the first sidewall, and a fourth sidewall opposite to the second sidewall, the rear plate is provided with an abutment hole used to be abutted with the lens, the first sidewall, the second sidewall, the third sidewall, and the fourth sidewall are connected in sequence and extend respectively from four sides of the rear plate in a direction away from the rear plate, so that the rear plate together with the first sidewall, the second sidewall, the third sidewall, and the fourth sidewall forms a box body structure with an opening in one side facing the rear plate, and the beam splitter can be accommodated in an accommodating space of the box body structure after being flipped;

wherein one end of the supporting plate is rotatably connected to the first sidewall and the third sidewall adjacent to the fourth sidewall, after being flipped, the supporting plate cover the opening to form a cover plate and another end of the supporting plate is connected with the second sidewall at a side of the second sidewall away from the rear plate, so as to seal the beam splitter in the main shell;

wherein one end of the beam splitter is rotatably connected to the first sidewall and the third sidewall adjacent to the fourth sidewall, another end of the beam splitter is configured to rotate towards the rear plate or away from the rear plate; and wherein a flexible light shield is further arranged between the beam splitter and the main shell; and one side of the flexible light shield is connected with the beam splitter and another side of the flexible light shield is connected with the main shell, the beam splitter is rotatable between a first position where the flexible light shield is expanded and a second position where the flexible light shield is folded into the accommodating space, wherein in the first position, said another end of the beam splitter rotates away from the rear plate to be out of the accommodating space, and in the second position, said another end of the beam splitter rotates towards the rear plate to be received into the accommodating space.

2. The foldable teleprompter according to claim 1, wherein a limiting structure is arranged at a joint of the supporting plate and the main shell, and the limiting structure enables the supporting plate to be stably perpendicular to the main shell after the supporting plate is flipped.

3. The foldable teleprompter according to claim 2, wherein a side of the supporting plate facing the main shell is provided with a pivot lug, and a position of the main shell corresponding to the pivot lug is provided with a pivot slot; the pivot lug extends into the pivot slot and forms pivot connection through a pivot shaft;
    after the pivot lug rotates to a position perpendicular to the main shell, an inner wall of the pivot slot resists against and supports the pivot lug.

4. The foldable teleprompter according to claim 1, wherein the main shell is provided with a locking slot used to lock the supporting plate; a position of the supporting plate corresponding to the locking slot is provided with a locking bulge;
    after the supporting plate covers the main shell, the locking bulge extends into the locking slot, so as to lock the supporting plate to the main shell.

5. The foldable teleprompter according to claim 1, wherein the main shell is provided with an avoiding gap used to facilitate pushing up the beam splitter; a position of the beam splitter corresponding to the avoiding gap is provided with an extending bulge;
    after the beam splitter is accommodated in the main shell, the extending bulge is embedded in the avoiding gap, so as to push up the beam splitter from the main shell.

\* \* \* \* \*